US007644982B2

(12) United States Patent
Paluch

(10) Patent No.: US 7,644,982 B2
(45) Date of Patent: Jan. 12, 2010

(54) REVERSIBLE SEAT ASSEMBLY

(75) Inventor: Zbigniew A. Paluch, Northville, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 12/092,718

(22) PCT Filed: Nov. 16, 2006

(86) PCT No.: PCT/CA2006/001864

§ 371 (c)(1),
(2), (4) Date: May 6, 2008

(87) PCT Pub. No.: WO2007/056850

PCT Pub. Date: May 24, 2007

(65) Prior Publication Data

US 2008/0290700 A1    Nov. 27, 2008

(51) Int. Cl.
*B60N 2/14* (2006.01)
(52) U.S. Cl. ............................ 297/95; 297/94; 297/101; 297/103
(58) Field of Classification Search ............. 297/94–95, 297/101, 103, 283.1, 283.3
See application file for complete search history.

(56) References Cited

U.S. PATENT DOCUMENTS

| 679,081 | A | | 7/1901 | Koehler |
| 1,140,097 | A | | 5/1915 | Anger |
| 1,488,659 | A | | 4/1924 | Abel et al. |
| 3,877,746 | A | | 4/1975 | Christine et al. |
| 4,081,051 | A | * | 3/1978 | Logsdon ...................... 180/331 |
| 4,720,143 | A | * | 1/1988 | Schwartz et al. ............ 297/326 |
| 5,224,750 | A | * | 7/1993 | Clark et al. .............. 296/65.06 |
| 5,362,124 | A | | 11/1994 | Schlidt |
| 6,474,741 | B2 | * | 11/2002 | Kamida et al. ......... 297/378.12 |
| 6,715,825 | B2 | | 4/2004 | Tame |
| 6,793,285 | B1 | * | 9/2004 | Tame ......................... 297/336 |
| 7,108,305 | B2 | * | 9/2006 | Frazier et al. ............ 296/65.03 |
| 7,188,883 | B2 | * | 3/2007 | Van Dyk et al. ......... 296/65.01 |
| 7,517,020 | B2 | * | 4/2009 | Yokota .................. 297/344.15 |
| 2005/0253433 | A1 | | 11/2005 | Brown et al. |

FOREIGN PATENT DOCUMENTS

| CA | 2403452 A1 | 9/2001 |
| DE | 43 36 710 A1 | 4/1994 |
| GB | 699609 A | 11/1953 |
| JP | 01635269 | 5/1994 |

\* cited by examiner

*Primary Examiner*—David Dunn
*Assistant Examiner*—Erika Garrett
(74) *Attorney, Agent, or Firm*—Clark Hill PLC

(57) ABSTRACT

A reversible seat assembly includes a pair of spaced apart risers. A seat cushion is operatively coupled to the risers for movement between a first inclined position wherein a front end is farther from the floor than a rear end and a second inclined position wherein the rear end is farther from the floor than the front end. A seat back is operatively coupled to the risers for movement between first and second upright positions adjacent the rear and front ends of the seat cushion, respectively. A seat cushion control mechanism includes a pair of forward and rearward linkages operatively coupled between the front and rear ends of the seat cushion and the risers for automatically controlling the seat cushion between the first and second inclined positions in response to movement of the seat back between the first and second upright positions thereby defining forward and rearward-facing seating positions.

28 Claims, 15 Drawing Sheets

REVERSIBLE SEAT ASSEMBLY

BACKGROUND OF THE INVENTION

1. Field of the Invention

The present invention relates generally to a seat assembly, and more particularly, to a reversible seat assembly for an automotive vehicle.

2. Description of Related Art

Automotive vehicles, such as sport utility vehicles, full-size vans, and mini-vans commonly include front and rear driver side and passenger side seat assemblies for supporting occupants within the vehicle. These seat assemblies may include one or more bucket-type seat assemblies, elongated bench-type seat assemblies, or a combination of each, aligned in one or more rows within an interior compartment of the vehicle.

Each seat assembly typically includes a generally horizontal seat cushion and a generally vertical or upright seat back coupled to the seat cushion for supporting the seat occupant in an upright seating position above a floor of the vehicle. The seat back is commonly pivotally coupled to the seat cushion by a recliner mechanism for providing pivotal movement of the seat back relative to the seat cushion between a plurality of reclined seating positions. The seat back may also pivot forwardly to a folded flat, or dumped, position lying flat against the seat cushion for providing additional storage space within the interior compartment of the vehicle or to allow easy access behind the seat assembly.

It is well known in the vehicle seating art to provide rear seat assemblies mounted to the floor of the vehicle by a swivel pedestal for allowing the seat assembly to swivel, or rotate, about its vertical axis from a conventional forward-facing configuration to a rearward-facing configuration. For example, the vehicle may include both a second and third row of seat assemblies behind the front driver and passenger seat assemblies wherein the second row of seat assemblies are rotatable from the conventional forward-facing position to a rearward-facing position, facing toward the third row of seat assemblies. Alternatively, the third row of seat assemblies may be rotatable from the conventional forward-facing position to the rearward-facing position, facing toward the rear of the vehicle in what is commonly referred to as the tailgating position.

It remains desirable to provide a walk-over or reversible seat assembly wherein the seat back is positionable, or reversible, between forward and rearward-facing seating positions, and is operatively coupled to the seat cushion for pivoting the seat cushion between first and second inclined positions. It is also desirable to provide a reversible seat assembly including a single latch assembly for securing the seat assembly in each of the forward and rearward-facing seating positions. It is also desirable to provide a reversible seat assembly including a seat belt buckle that is automatically positioned relative to the seat assembly in both the forward and rearward-facing seating positions. It is also desirable to provide a reversible seat assembly including a head restraint that automatically pivots to a dumped position to avoid a headliner of the vehicle when moving the seat assembly between the forward and rearward-facing seating positions.

SUMMARY OF THE INVENTION

According to one aspect of the invention, a reversible seat assembly is provided for use in an automotive vehicle and includes a pair of spaced apart seat risers adapted for mounting the seat assembly to a floor of the vehicle. A seat cushion extends between a front end and a rear end. The seat cushion is operatively coupled to the pair of seat risers for movement between a first inclined position wherein the front end is spaced farther from the floor than the rear end and a second inclined position wherein the rear end is spaced farther from the floor than the front end. A seat back is operatively coupled to the risers by a pair of parallel forward and rearward control links. The forward control links extend between upper ends pivotally coupled to the seat back and lower ends pivotally coupled to the seat risers by a forward control rod extending between the seat risers. The rearward control links extend between upper ends pivotally coupled to the seat back and lower ends pivotally coupled to the seat risers by a rearward control rod extending between the seat risers. A seat cushion control mechanism includes a pair of forward linkages operatively coupled between the front end of the seat cushion and the seat risers and a pair of rearward linkages operatively coupled between the rear end of the seat cushion and the seat risers. The forward and rearward linkages automatically control the seat cushion between the first and second inclined positions in response to movement of the seat back between a first upright position adjacent the rear end of the seat cushion and a second upright position adjacent the front end of the seat cushion, thereby defining a forward-facing seating position and a rearward-facing seating position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
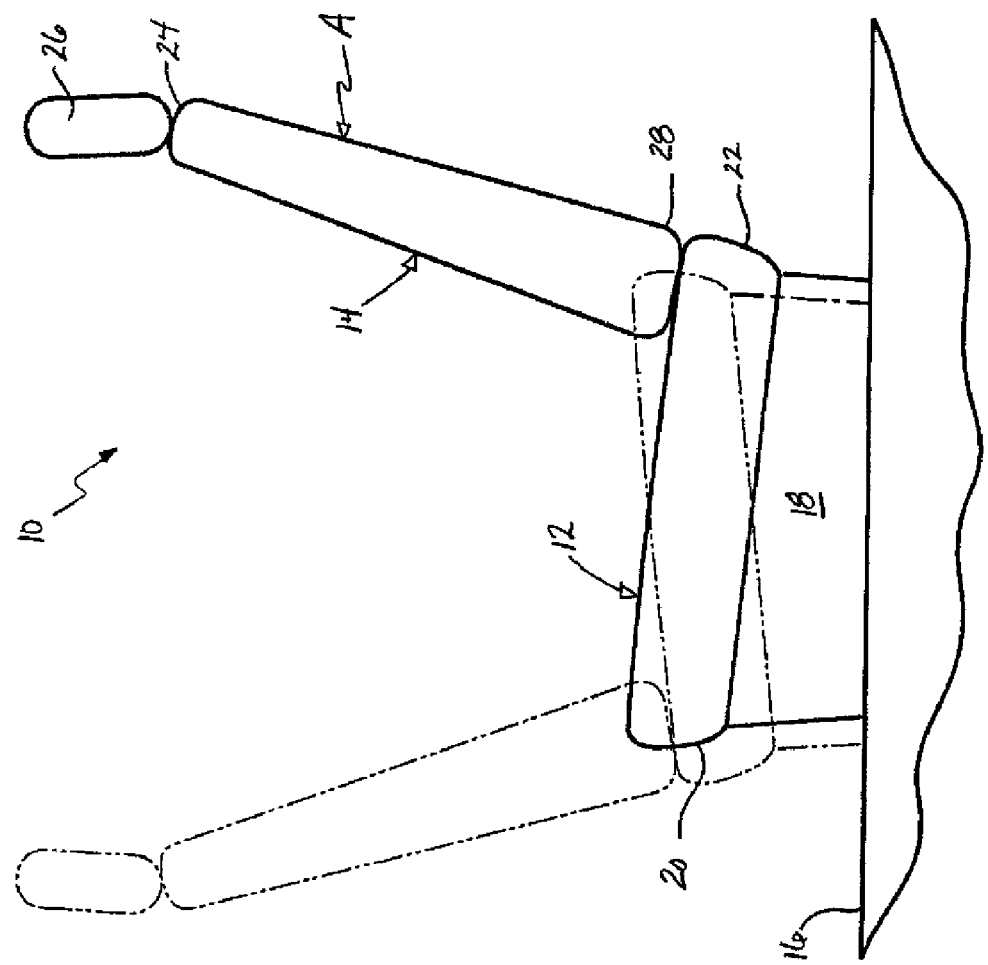
FIG. 1 is a side view of a reversible seat assembly according to one embodiment of the invention illustrating a forward-facing seating position in solid lines and a rearward-facing seating position in hidden lines.

Referring to FIG. 1, a walk-over or reversible seat assembly according to the subject invention is generally shown at 10 for use in an automotive vehicle. The seat assembly 10 includes a seat cushion 12 and a seat back 14 operatively coupled to the seat cushion 12 for supporting a seat occupant in a generally upright seating position. The seat cushion 12 is supported above a floor 16 in the vehicle by a seat riser assembly 18. The seat assembly 10 may include a bucket-type seat, a bench-type seat, or a split-type seat, such as a 60/40 seat, as is commonly known to one skilled in the art without varying from the scope of the invention. The seat cushion 12 includes a front end 20 and an opposite rear end 22. The seat back 14 includes an upper end 24 for supporting a head restraint 26 and an opposite lower end 28 positioned adjacent the seat cushion 12.

FIG. 1 discloses the seat assembly 10 in a plurality of seating positions. First, the seat assembly 10 is illustrated in solid lines in a forward-facing seating position at A. Forward-facing is defined as the seat cushion 12 and seat back 14 positioned to support the seat occupant in a direction facing toward the front of the vehicle, as is commonly known. With the seat assembly 10 in the forward-facing seating position A, the seat cushion 12 is in a first inclined position such that the front end 20 is spaced farther from the vehicle floor 16 than the rear end 22. Additionally, the seat back 14 is in a first generally upright position with the lower end 28 immediately adjacent the rear end 22 of the seat cushion 12. Second, the seat assembly 10 is illustrated in hidden lines in a rearward-facing seating position at B. Rearward-facing is defined as the seat cushion 12 and seat back 14 positioned to support the seat occupant in a direction facing toward the rear of the vehicle. With the seat assembly 10 in the rearward-facing seating position B, the seat cushion 12 is in a second inclined position such that the rear end 22 is spaced farther from the vehicle floor 16 than the front end 20. Additionally, the seat back 14 is in a second generally upright position, however, the lower end 28 is now immediately adjacent the front end 20 of the seat cushion 12.

Figure 2:
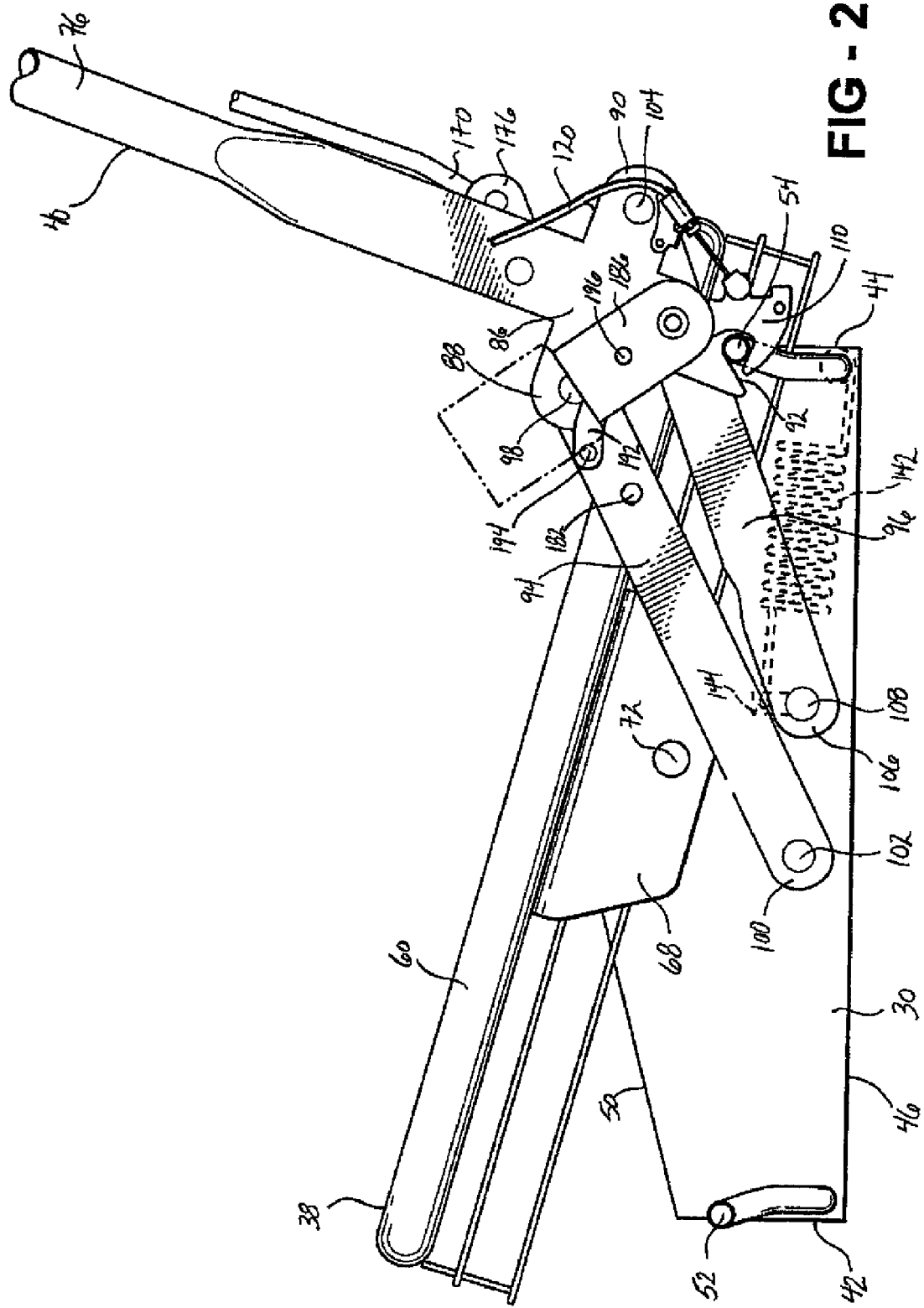
FIG. 2 is a fragmentary, side view of the reversible seat assembly in the forward-facing seating position.
Figure 7:
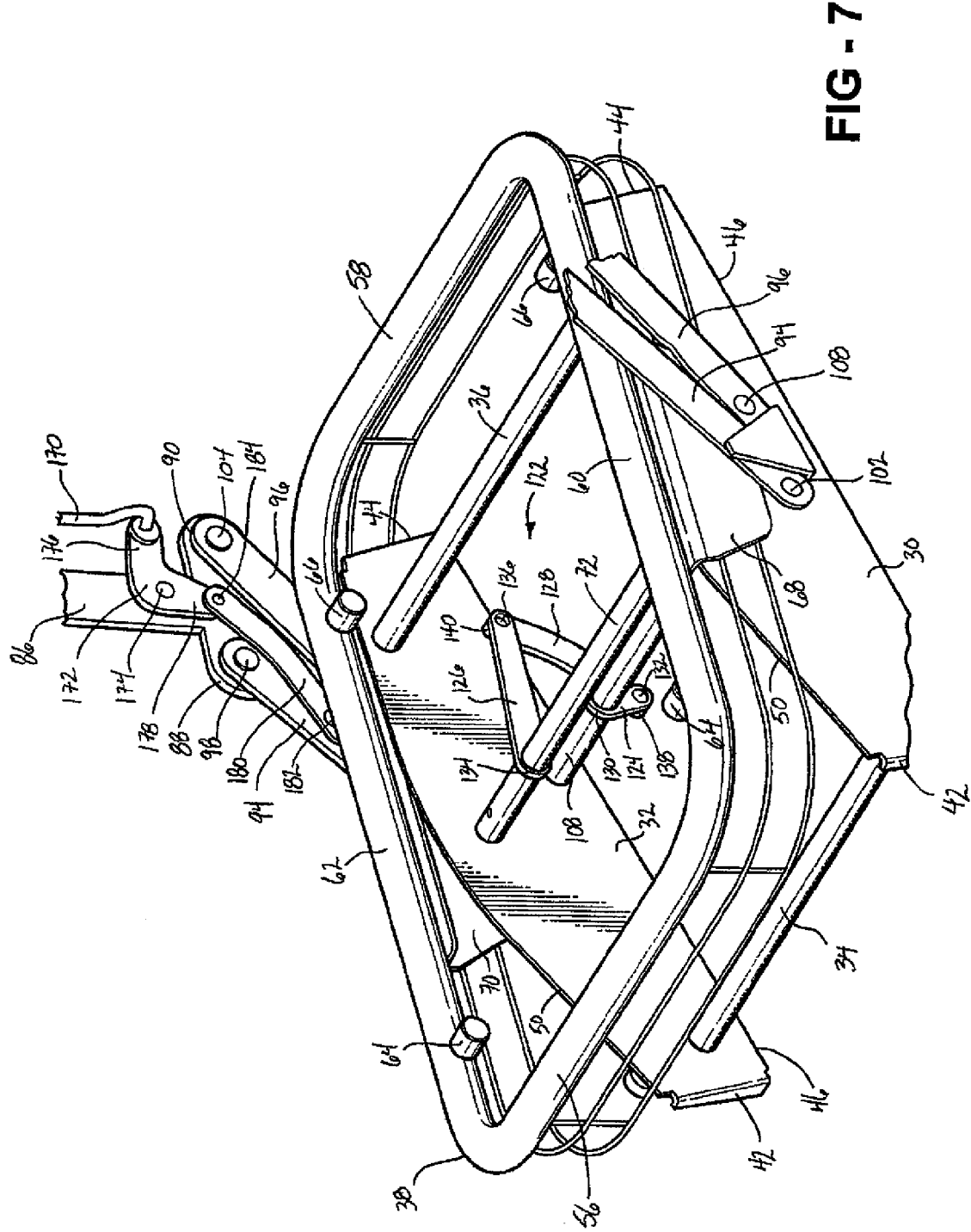
FIG. 7 is a fragmentary, perspective view of the reversible seat assembly illustrating a seat cushion control mechanism.

Referring to FIG. 2, the seat assembly 10 is a passenger-side seat and is shown in the forward-facing seating position A. The seat assembly 10 includes an inboard seat riser 30 and an outboard seat riser 32 for fixedly securing the seat assembly 10 to the vehicle floor 16, as shown in FIG. 7. The inboard 30 and outboard 32 seat risers are parallel, spaced apart, and interconnected by front 34 and rear 36 cross bars extending laterally between and through the seat risers 30, 32. The front 34 and rear 36 cross bars are disposed adjacent the respective front 20 and rear 22 ends of the seat cushion 12. The seat cushion 12 includes a tubular and generally rectangular seat cushion frame 38 disposed therein. The seat back 14 similarly includes a tubular and generally U-shaped seat back frame 40 disposed therein. The seat cushion frame 38 and the seat back frame 40 are each operatively coupled to the inboard 30 and outboard 32 seat risers, as will be further described below.

Figure 3:
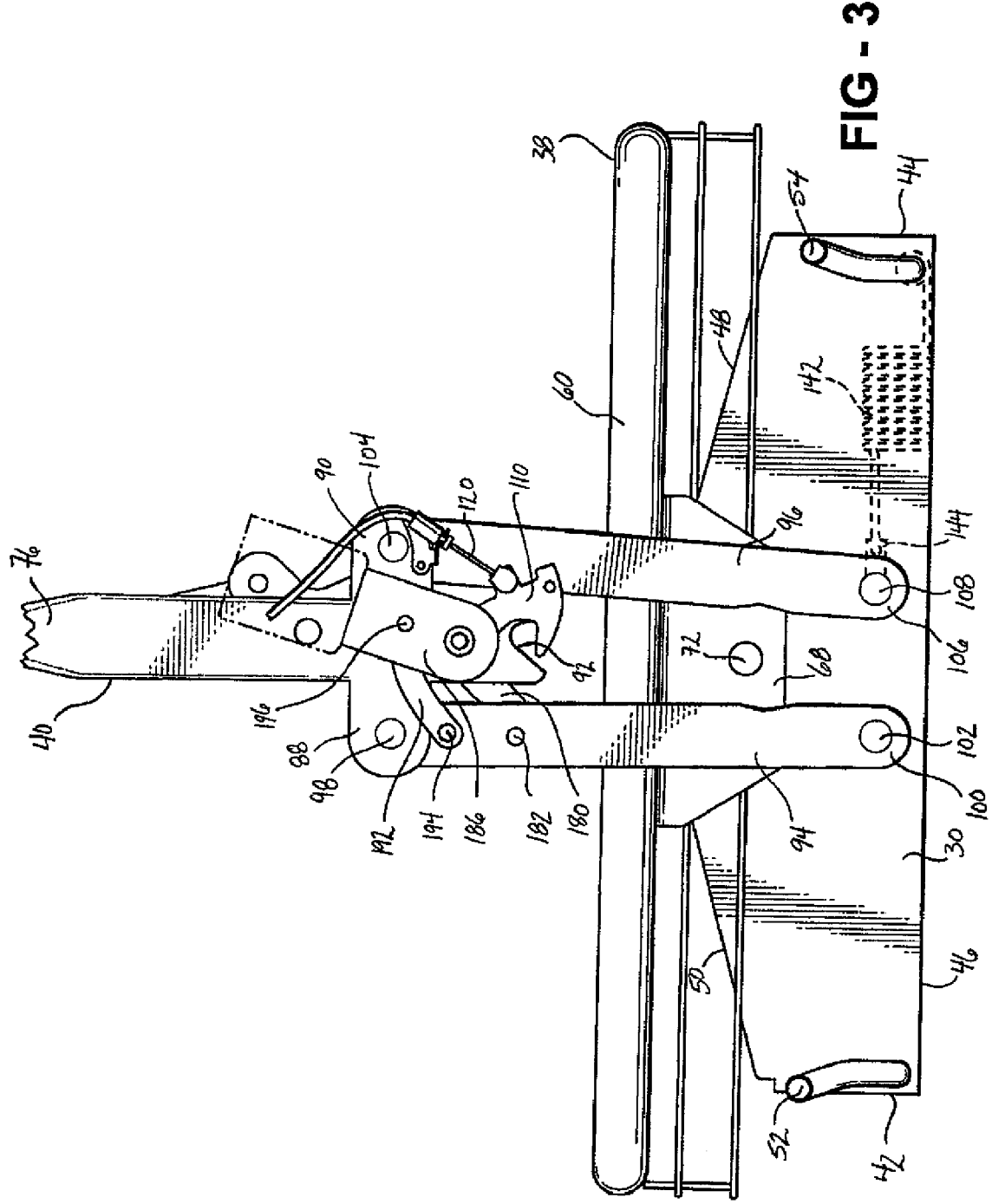
FIG. 3 is a fragmentary, side view of the reversible seat assembly in a neutral position.
Figure 4:
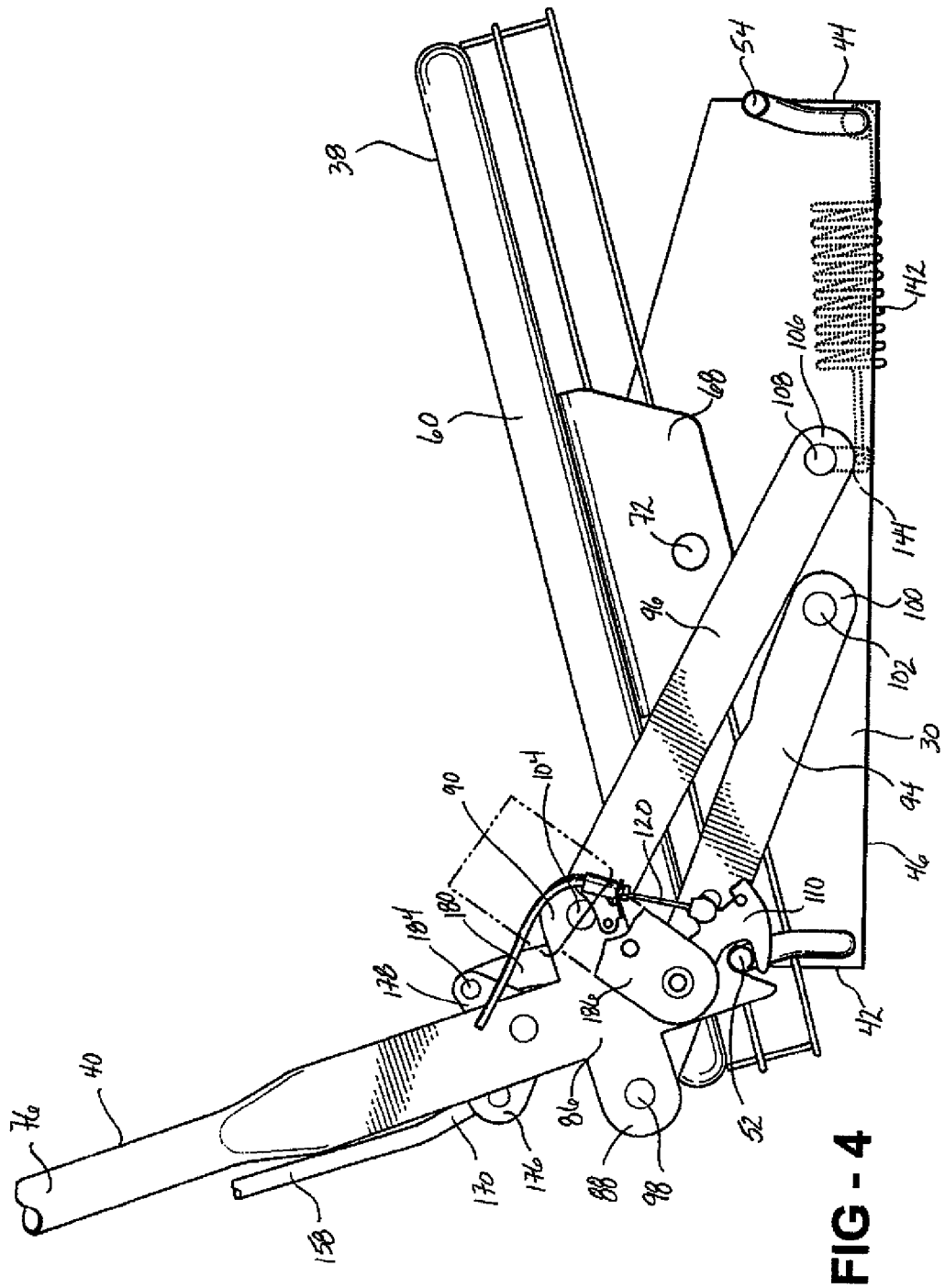
FIG. 4 is a fragmentary, side view of the reversible seat assembly in a rearward-facing seating position.

Referring to FIGS. 2 through 4, the inboard 30 and outboard 32 seat risers extend between a forward end 42 and a rearward end 44. Each of the seat risers 30, 32 include a bottom edge 46 adapted to be mounted to the floor 16 of the vehicle such as by bolts. Each of the seat risers 30, 32 also include an upper first inclined edge 48 and an upper second inclined edge 50 extending from the respective forward 42 and rearward 44 ends to a center peak therebetween. A forward striker 52 is mounted to opposing ends of the front cross bar 34, outwardly of each of the seat risers 30, 32. Similarly, a rearward striker 54 is mounted to opposing ends of the rear cross bar 36, outwardly of each of the seat risers 30, 32.

Referring to FIG. 7, the seat cushion frame 38 includes a front tube 56 adjacent the front cross bar 34 and a rear tube 58 adjacent the rear cross bar 36. A pair of laterally spaced apart inboard 60 and outboard 62 tubes interconnect the front tube 56 and the rear tube 58. A pair of first 64 and second 66 cylindrical support posts project inwardly from each of the inboard 60 and outboard 62 tubes, respectively. The first support posts 64 are positioned adjacent the front tube 56 and the second support posts 66 are positioned adjacent the rear tube 58.

The seat cushion frame 38 also includes first 68 and second 70 mounting brackets. The first mounting bracket 68 is fixedly secured to the inboard tube 60 and the second mounting bracket 70 is fixedly secured to the outboard tube 62 by bolts, welds, or the like. A main pivot rod 72 extends laterally between the mounting brackets 68, 70 for pivotally coupling the mounting brackets 68, 70 to the respective inboard 30 and outboard 32 seat risers. More specifically, the main pivot rod 72 extends between and through the spaced apart seat risers 30, 32 to support and provide pivotal movement of the seat cushion frame 38, and therefore the seat cushion 12 relative to the seat risers 30, 32. The first 64 or second 66 support posts position and support the seat cushion frame 38 on either the first 48 or second 50 inclined edges of the seat risers 30, 32 such that the seat cushion 12 is in either the first inclined position or the second inclined position depending on the position of the seat back 14, as will be further discussed.

Figure 8:
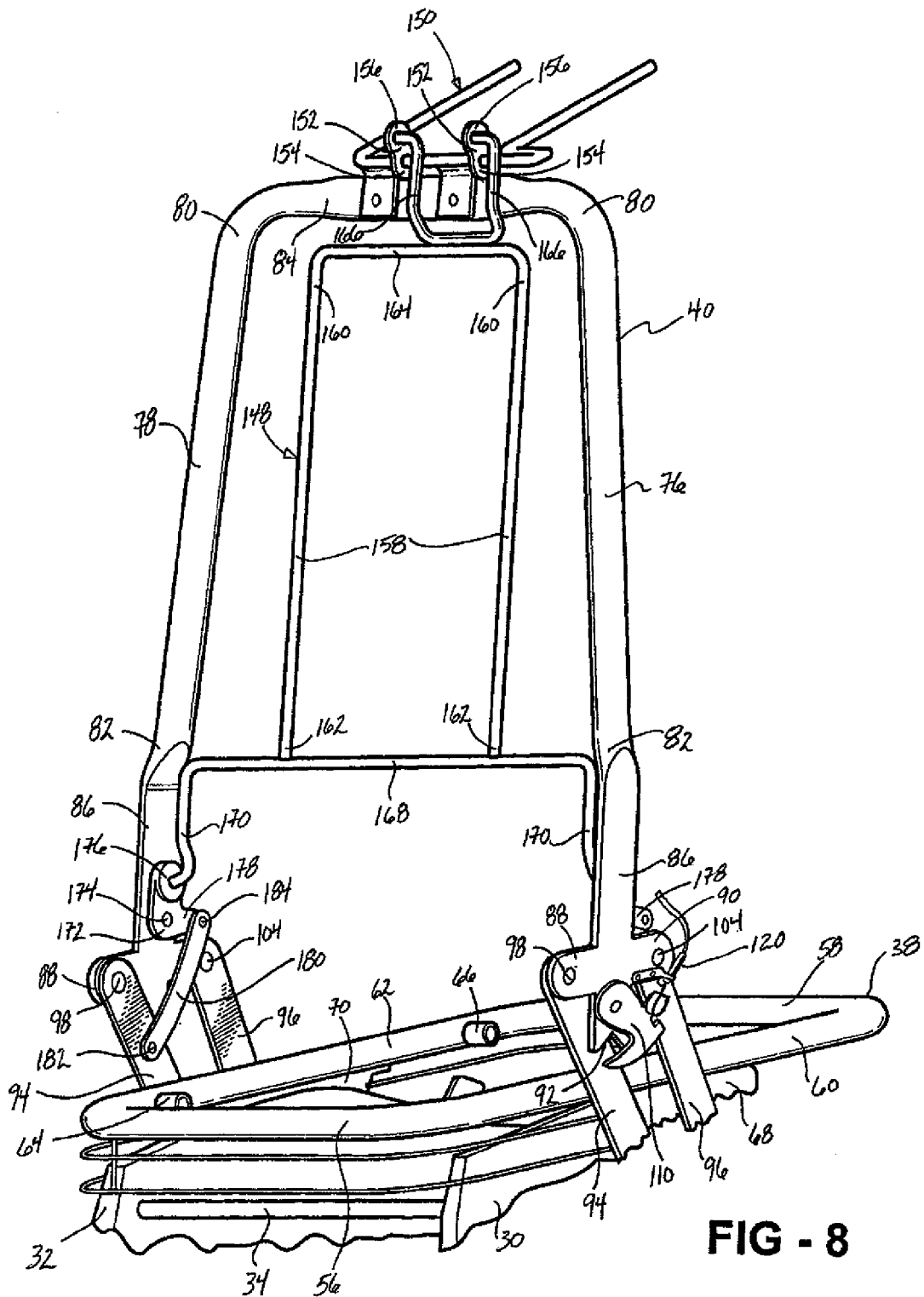
FIG. 8 is a fragmentary, perspective view of the reversible seat assembly illustrating a seat back control mechanism.

Referring to FIG. 8, the seat back frame 40 includes a pair of laterally spaced apart inboard 76 and outboard 78 tubes. Each of the inboard 76 and outboard 78 tubes extend between an upper end 80 and a lower end 82. The upper ends 80 are interconnected by an upper cross tube 84. An end bracket 86 is fixedly secured to the lower end 82 of each of the inboard 76 and outboard 78 tubes. It will be appreciated that the end bracket 86 may be integrally formed as part of the lower end 82 of the inboard 76 and outboard 78 tubes without varying from the scope of the invention. Each end bracket 86 defines a pair of oppositely extending arms 88, 90 and a downward-facing V-shaped notch 92.

Referring to FIGS. 2 through 4, the seat back frame 40 is operatively coupled to the inboard 30 and outboard 32 seat risers by a pair of four bar linkage mechanisms consisting of an elongated forward control link 94 and an elongated rearward control link 96. Each of the forward control links 94 extend between an upper end 98 and an opposite lower end 100. The upper end 98 of each of the forward control links 94 is pivotally coupled to the end bracket arm 88 extending from the respective inboard 76 and outboard 78 tubes. The lower end 100 of each of the forward control links 94 is pivotally coupled to a laterally extending forward control rod 102, which is fixedly secured to and extends outwardly from the respective inboard 30 and outboard 32 seat risers. It will be appreciated that the forward control rods 102 may in the alternative be a single forward control rod extending between and through the spaced apart seat risers 30, 32 without varying from the scope of the invention.

Similarly, each of the rearward control links 96 extend between an upper end 104 and an opposite lower end 106. The upper end 104 of each of the rearward control links 96 is pivotally coupled to the end bracket arm 90 extending from the respective inboard 76 and outboard 78 tubes. The lower end 106 of each of the rearward control links 96 is fixedly secured to opposite ends of a laterally extending rearward control rod 108 such that pivoting the rearward control links 96 rotates the rearward control rod 108. The rearward control rod 108 extends between and through the spaced apart seat risers 30, 32. Pivoting the forward 94 and rearward 96 control links about the respective lower ends 100, 106 moves the seat back frame 40, and therefore the seat back 14 between the first upright position, as shown in FIG. 2, and the second upright position, as shown in FIG. 4.

Figure 5:
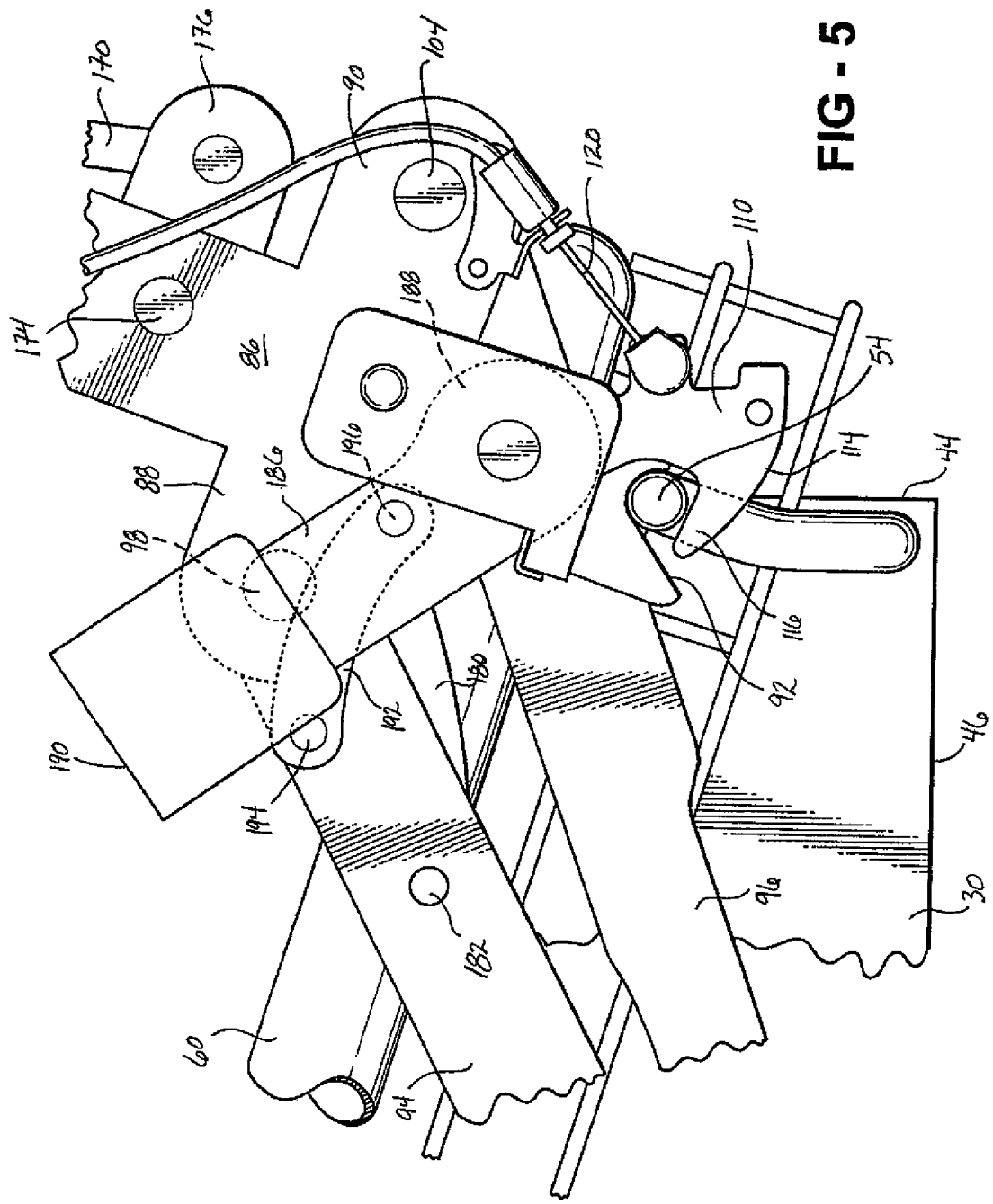
FIG. 5 is a fragmentary, side view of the reversible seat assembly illustrating a latch assembly securing the reversible seat assembly in the forward-facing seating position.
Figure 6:
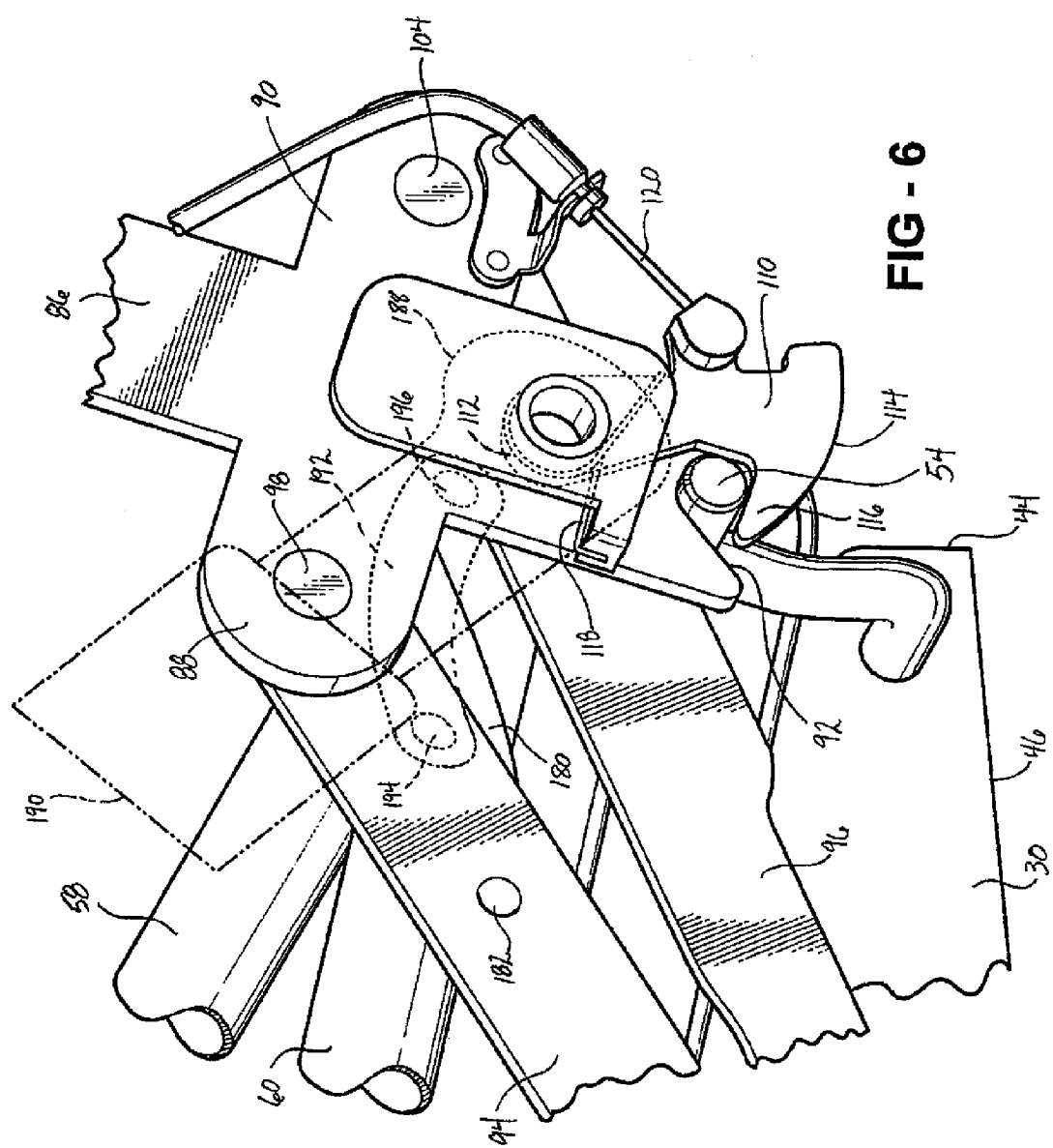
FIG. 6 is a fragmentary, perspective view of the latch assembly of FIG. 5.

The V-shaped notch 92 formed in the end bracket 86 engages the rearward striker 54 for supporting the seat back 14 in the first upright position when the seat cushion 12 is in the first inclined position, as shown in FIGS. 2 and 5. Similarly, the notch 92 engages the forward striker 52 for supporting the seat back 14 in the second upright position when the seat cushion 12 is in the second inclined position, as shown in FIG. 4. Further, referring to FIGS. 5 and 6, the seat back 14 is releasably retained in each of the first and second upright positions by a two-way latch mechanism 110. The latch mechanism 110 has a first end 112 pivotally coupled to the end bracket 86 and an opposite cam end 114 defining a hook portion 116 for engaging one of the forward 52 or rearward 54 strikers, depending on the position of the seat back 14. A coil spring 118 is coupled between the end bracket 86 and the latch mechanism 110 for biasing the latch mechanism 110 to a locked position. A push-pull Bowden-type cable 120 is connected to the cam end 114 for releasing the latch mechanism 110 to an unlocked position disengaged from the forward 52 and rearward 54 strikers.

Referring to FIG. 7, the seat assembly 10 also includes a seat cushion control mechanism or linkage, generally shown at 122, for automatically controlling the angular position of the seat cushion frame 38, and therefore the seat cushion 12 between the first and second inclined positions in response to movement of the seat back 14 between the first and second upright positions. The control mechanism 122 is operatively coupled between the rearward control rod 108 and the main pivot rod 72. More specifically, the control mechanism 122 includes a first link 124, a second link 126, and a third link 128. The first link 124 extends between a proximal end 130 fixedly secured to the rearward control rod 108 and an opposite distal end 132. The second link 126 extends between a proximal end 134 fixedly secured to the main pivot rod 72 and an opposite distal end 136. The third link 128 extends between a first end 138 pivotally coupled to the distal end 132 of the first link 124 and a second end 140 pivotally coupled to the distal end 136 of the second link 126. In the embodiment shown, the third link 128 has a curvature or bend between the first 138 and second 140 ends.

A tension coil spring 142 extends between the rear cross bar 36 and the rearward control rod 108 for biasing the seat back 14 to a neutral position between the first and second upright positions, as shown in FIGS. 2 through 4. More specifically, the spring 142 extends between the rear cross bar 36 and a spring tab 144 mounted to the rearward control rod 108. The spring tab 144 extends horizontally toward the rear cross bar 36 when the seat back 14 is in the neutral position such that the spring 142 is not extended. As the seat back 14 is moved from the neutral position toward either of the first or second upright positions, the rearward control rod 108 rotates and the spring tab 144 mounted thereto moves in a direction away from the rear cross bar 36, which causes the spring 142 to extend. Extending the spring 142 creates a force that must be overcome in order to move the seat assembly 10 into either the forward-facing seating position A or the rearward-facing seating position B.

Referring to FIG. 8, the seat assembly 10 further includes a pair of seat back control mechanisms or linkages, generally shown at 146, for automatically controlling the position of an inner suspension support frame 148 relative to the seat back frame 40 in response to movement of the seat back 14 between the first and second upright positions while at the same time controlling the angular position of the head restraint 26. The head restraint 26 includes a generally U-shaped head restraint frame, generally indicated at 150, pivotally coupled to the upper cross tube 84 of the seat back frame 40. A pair of toggle links 152 have proximal ends 154 fixedly secured to the head restraint frame 150 and opposite distal ends 156. The inner suspension support frame 148 includes a pair of spaced apart, elongated and cylindrical support bars 158 extending parallel with the inboard 76 and outboard 78 tubes between first ends 160 and second ends 162. A cylindrical upper cross bar 164 which is generally perpendicular to the support bars 158 extends between the first ends 160. A pair of upper control arms 166 fixedly secured to the upper cross bar 164 is pivotally coupled to the distal ends 156 of the toggle links 152. The second ends 162 are connected to a cylindrical lower cross bar 168 which is generally perpendicular to the support bars 158 and extends between the inboard 76 and outboard 78 tubes. Opposing ends of the lower cross bar 168 are bent downwardly forming lower control arms 170.

Referring to the outboard side of the seat assembly 10, one of the pair of seat back control mechanisms 146 will be described in detail. The control mechanism 146 is operatively coupled between the forward control link 94 and the inner suspension support frame 148. The control mechanism 146 includes a control cam 172 pivotally coupled to the end bracket 86 at pivot 174. The control cam 172 includes a first lobe 176 and a second lobe 178. The lower control arm 170 is pivotally coupled to the first lobe 176. A seat back control link 180 extends between a first end 182 pivotally coupled to the forward control link 94, between the upper 98 and lower 100 ends, and an opposite second end 184 pivotally coupled to the second lobe 178. When the seat back 14 is in the first upright position, such that the seat assembly 10 is in the forward-facing seating position A, the inner suspension support frame 148 is disposed rearwardly of the seat back frame 40, as shown in FIG. 2, and the head restraint 26 is tilted forwardly (not shown). Alternatively, when the seat back 14 is in the second upright position, such that the seat assembly 10 is in the rearward-facing seating position B, the inner suspension support frame 148 is disposed forwardly of the seat back frame 40, as shown in FIG. 4, and the head restraint 26 is tilted rearwardly (not shown).

Finally, referring to FIG. 5, the inboard side of the seat assembly 10 includes an automatically adjusting seat belt buckle 186. The buckle 186 extends between a proximal end 188 pivotally coupled to the end bracket 86 and an opposite distal end 190 for receiving a tongue or male connector of a seat belt, as is well known in the art. A guide link 192 extends between a first end 194 and a second end 196. The first end 194 is pivotally coupled to the forward control link 94 adjacent the upper end 98 and the second end 196 is pivotally coupled to the buckle 186 at a position spaced toward the proximal end 188. When the seat back 14 moves between the first and second upright positions, the guide link 192 automatically moves the buckle 186 such that the angular orientation of the buckle 186 relative to the seat assembly 10 is in a position suitable for seat belt use. That is, as the seat back 14 moves, the distance between the forward control rod 94 and the buckle 186 varies such that the guide link 192 pushes or pulls the buckle 186, thereby pivoting the buckle 186 relative to the seat back 14 for proper angular orientation.

In operation, starting with the seat assembly 10 in the forward-facing seating position A, the cable 120 is actuated to release the latch mechanism 110 from the rearward striker 54 to move the seat back 14 from the first upright position to the second upright position. Moving the seat back 14 from the first upright position to the second upright position causes the forward 94 and rearward 96 control links to pivot about the respective lower ends 100, 106 in the counterclockwise direction (when viewed from FIG. 2). The pivotal movement of the rearward control link 96 causes the rearward control rod 108 to rotate in the counterclockwise direction, which in turn actuates the seat cushion control mechanism 122. More specifically, the counterclockwise rotation of the rearward control rod 108 pivots the first link 124 in the counterclockwise direction which transfers upward motion through the third link 128 to pivot the second link 126 in the counterclockwise direction. The pivotal movement of the second link 126 forces rotation of the main pivot rod 72 in the counterclockwise direction. The counterclockwise rotation of the main pivot rod 72 pivots the seat cushion 12 from the first inclined position to the second inclined position.

During the movement of the seat back 14 from the first upright position to the second upright position, the distance between the forward control link 94 and the end bracket 86 decreases such that the seat back control link 180 pushes on the second lobe 178 of the control cam 172, rotating the control cam 172 in the counterclockwise direction about pivot 174. As the control cam 172 rotates in the counterclockwise direction the first lobe 176 acts on the lower control arm 170 such that the inner suspension support frame 148 pivots to the position forwardly of the seat back frame 40. At the same time, the pivotal movement of the inner suspension support frame 148 causes the upper control arms 166 to pull on the toggle links 152 to tilt the head restraint frame 150 such that the head restraint 26 is tilted rearwardly.

As the seat back 14 approaches the second upright position, the cam end 114 of the latch mechanism 110 cammingly engages the forward striker 52 forcing the latch mechanism 110 to pivot in the counterclockwise direction to the unlocked position allowing the hook portion 116 to receive the forward striker 52 therein. The spring 118 then returns the latch mechanism 110 to the locked position engaged with the forward striker 52 to retain the seat back 14 in the second upright position and the seat cushion 12 in the second inclined position. The seat assembly 10 is now in the rearward-facing seating position B, as shown in FIG. 4.

Additionally, as the seat back 14 moves from the first upright position to the second upright position, the distance between the forward control link 94 and the buckle 186 decreases such that the guide link 192 pushes the buckle 186 causing the buckle 186 to pivot about the proximal end 188 for proper angular orientation when the seat assembly 10 is in the rearward-facing seating position B.

To return the seat assembly 10 to the forward-facing seating position A the cable 120 is actuated to release the latch mechanism 110 from the forward striker 52 to move the seat back 14 from the second upright position to the first upright position. Moving the seat back 14 from the second upright position to the first upright position causes the forward 94 and rearward 96 control links to pivot about the respective lower ends 100, 106 in the clockwise direction (when viewed from FIG. 4). The pivotal movement of the rearward control link 96 causes the rearward control rod 108 to rotate in the clockwise direction, which in turn actuates the seat cushion control mechanism 122. More specifically, the clockwise rotation of the rearward control rod 108 pivots the first link 124 in the clockwise direction which transfers downward motion through the third link 128 to pivot the second link 126 in the clockwise direction. The pivotal movement of the second link 126 forces rotation of the main pivot rod 72 in the clockwise direction. Clockwise rotation of the main pivot rod 72 pivots the seat cushion 12 from the second inclined position to the first inclined position.

During the movement of the seat back 14 from the second upright position to the first upright position, the distance between the forward control link 94 and the end bracket 86 increases such that the seat back control link 180 pulls on the second lobe 178 of the control cam 172, rotating the control cam 172 in the clockwise direction about pivot 174. As the control cam 172 rotates in the clockwise direction the first lobe 176 acts on the lower control arm 170 such that the inner suspension support frame 148 pivots to the position rearwardly of the seat back frame 40. At the same time, the pivotal movement of the inner suspension support frame 148 causes the upper control arms 166 to push on the respective toggle links 152 to tilt the head restraint frame 104 such that the head restraint 26 is tilted forwardly.

As the seat back 14 approaches the first upright position, the cam end 114 of the latch mechanism 110 cammingly engages the rearward striker 54 forcing the latch mechanism 110 to pivot in the counterclockwise direction to the unlocked position allowing the hook portion 116 to receive the rearward striker 54 therein. The spring 118 then returns the latch mechanism 110 to the locked position engaged with the rearward striker 54 to retain the seat back 14 in the first upright position and the seat cushion 12 in the first inclined position. The seat assembly 10 is now in the forward-facing seating position A, as shown in FIG. 2.

Additionally, as the seat back 14 moves from the second upright position to the first upright position, the distance between the forward control link 94 and the buckle 186 increases such that the guide link 192 pulls the buckle 186 causing the buckle 186 to pivot about the proximal end 188 for proper angular orientation when the seat assembly 10 is in the forward-facing seating position A.

Referring to FIGS. 9 through 15, wherein like primed reference numerals represent similar elements as those described above, in a second embodiment of the invention the seat cushion control mechanism 122' includes a pair of spaced apart forward linkages, generally indicated at 200, and a pair of spaced apart rearward linkages, generally indicated at 202. The forward 200 and rearward 202 linkages operatively couple the seat cushion frame 38' to the respective inboard 30' and outboard 32' seat risers for supporting and guiding the seat cushion frame 38', and hence the seat cushion 12', between the first and second inclined positions depending on the position of the seat back 14'.

Figure 14:
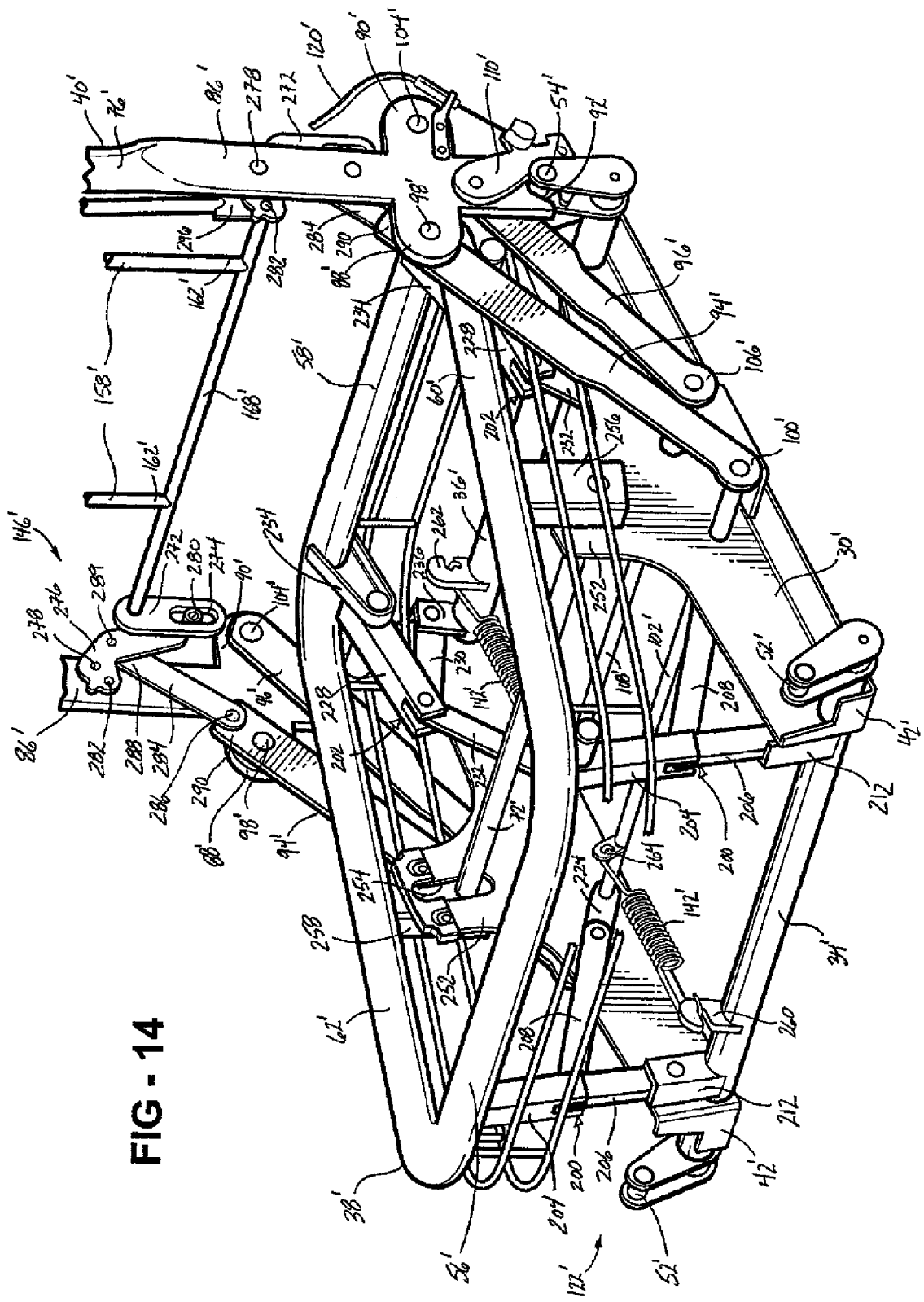
FIG. 14 is a fragmentary, perspective view of the reversible seat assembly in the forward-facing seating position.
Figure 15:
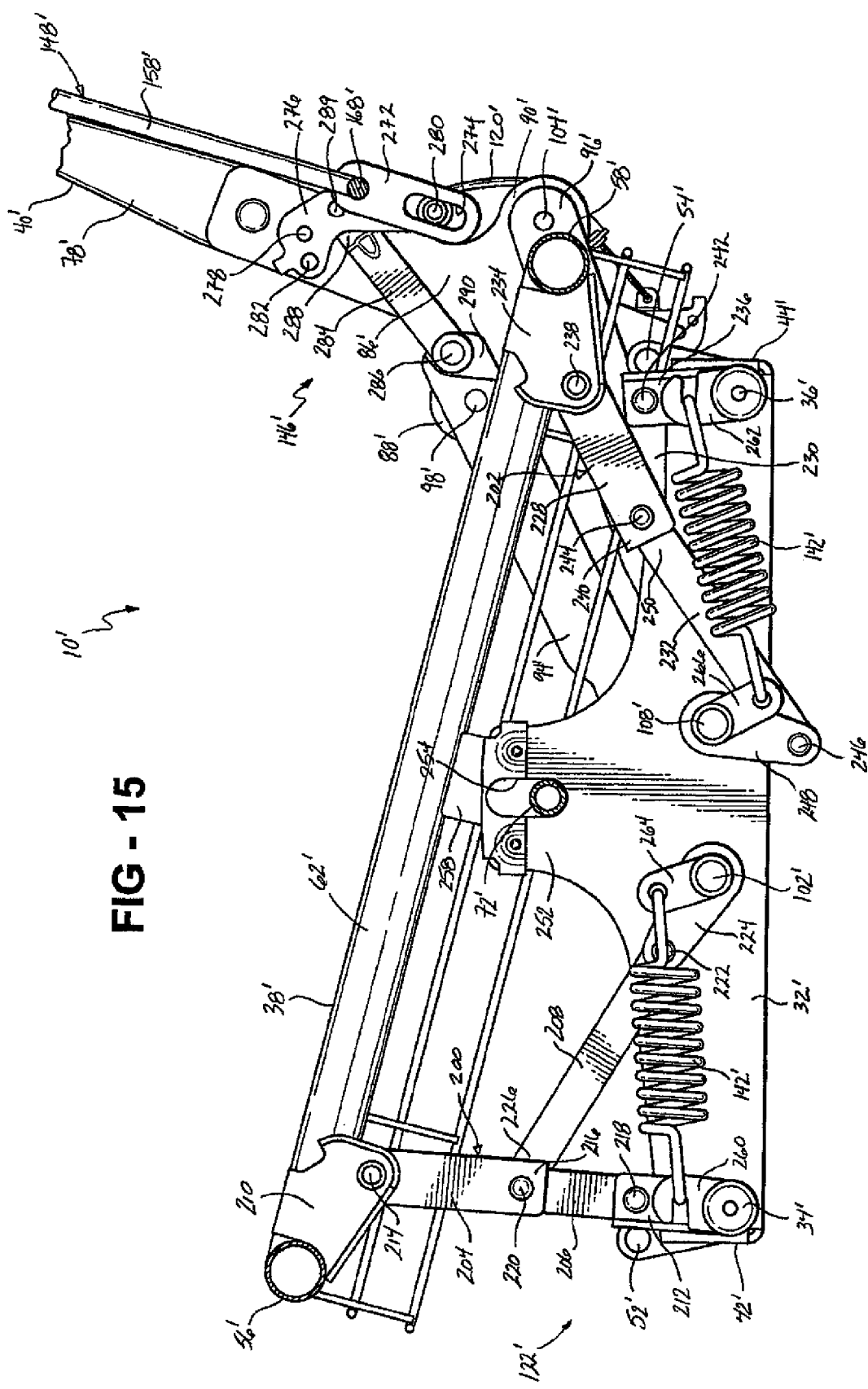
FIG. 15 is a cross-sectional view of FIG. 14.

Referring to FIGS. 14 and 15, each of the forward linkages 200 include an upper link 204, a lower link 206, and a guide link 208. A pair of spaced apart upper forward brackets 210 is fixedly secured to the front tube 56' of the seat cushion frame 38' and a pair of spaced apart lower forward brackets 212 is fixedly secured to the front cross bar 34'. Referring to the forward linkages 200, each upper link 204 extends between a proximal end 214 pivotally coupled to one of the upper forward brackets 210 and an opposite distal end 216. Each lower link 206 extends between a proximal end 218 pivotally coupled to one of the lower forward brackets 212 and an opposite distal end 220 pivotally coupled to the distal end 216 of the respective upper link 204. Each guide link 208 extends between a first end 222 pivotally coupled to a mounting tab 224 fixedly secured to the forward control rod 102' and a second end 226 pivotally coupled to the pivotal connection between the distal ends 216, 220 of the upper 204 and lower 206 links.

Similarly, each of the rearward linkages 202 includes an upper link 228, a lower link 230, and a guide link 232. A pair of spaced apart upper rearward brackets 234 is fixedly secured to the rear tube 58' of the seat cushion frame 38' and a pair of spaced apart lower rearward brackets 236 is fixedly secured to the rear cross bar 36'. Referring to the rearward linkages 202, each upper link 228 extends between a proximal end 238 pivotally coupled to one of the upper rearward brackets 234 and an opposite distal end 240. Each lower link 230 extends between a proximal end 242 pivotally coupled to one of the lower rearward brackets 236 and an opposite distal end 244 pivotally coupled to the distal end 240 of the respective upper link 228. Each guide link 232 extends between a first end 246 pivotally coupled to a mounting tab 248 fixedly secured to the rearward control rod 108' and a second end 250 pivotally coupled to the pivotal connection between the distal ends 240, 244 of the upper 228 and lower 230 links.

Figure 9:
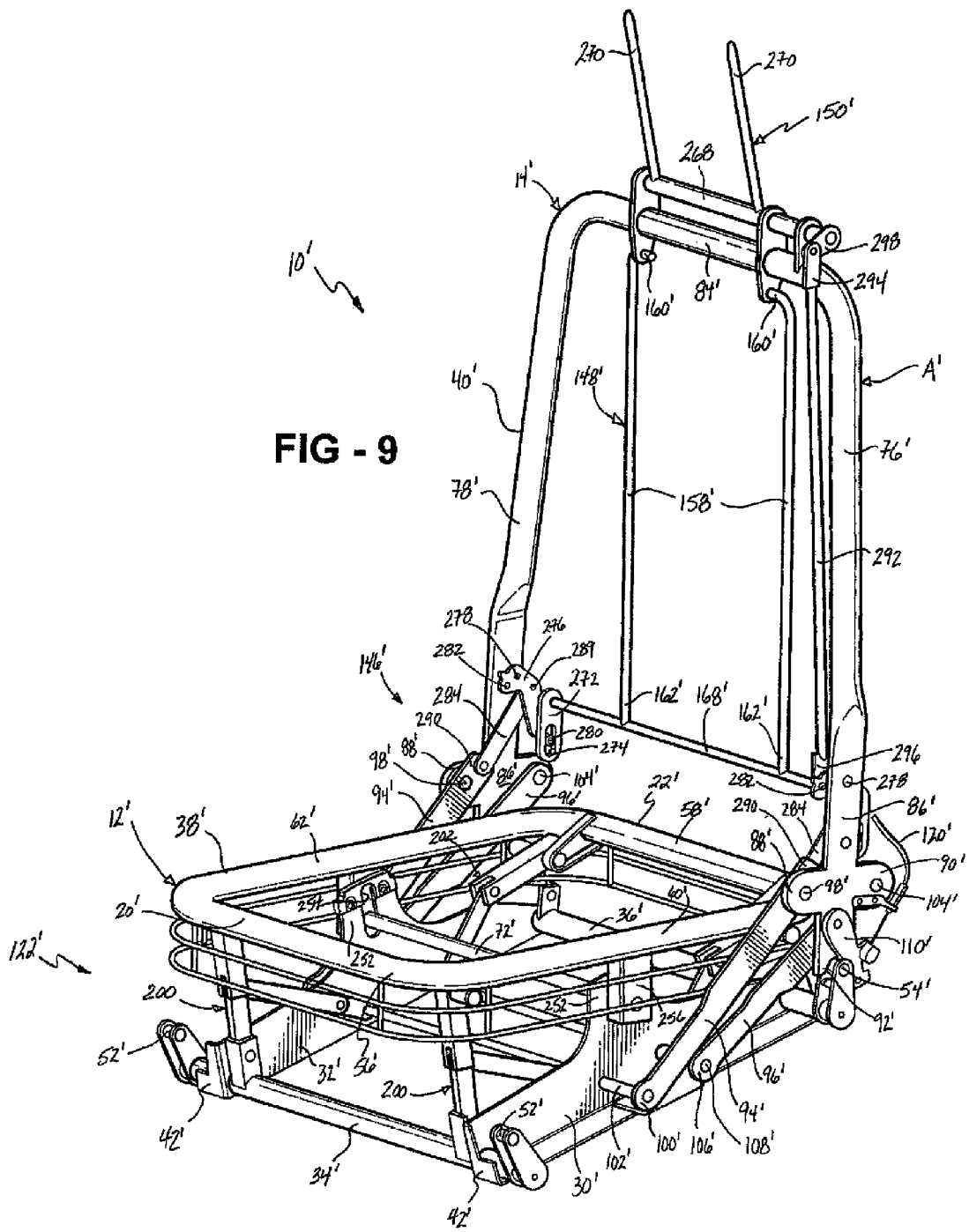
FIG. 9 is a perspective view of the reversible seat assembly in the forward-facing seating position according to a second embodiment of the invention.
Figure 11:
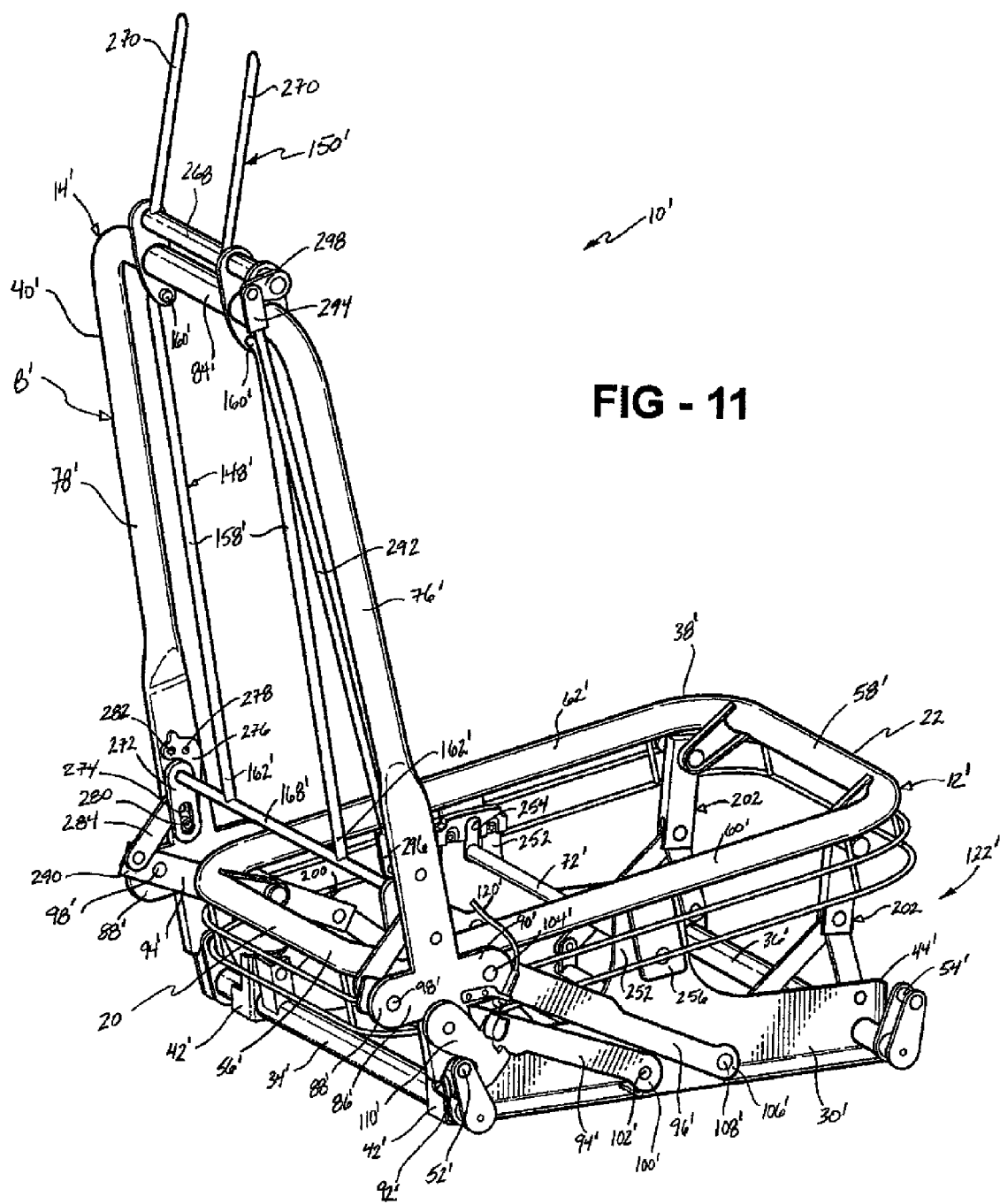
FIG. 11 is a perspective view of the second embodiment of the reversible seat assembly in the rearward-facing seating position.
Figure 12:
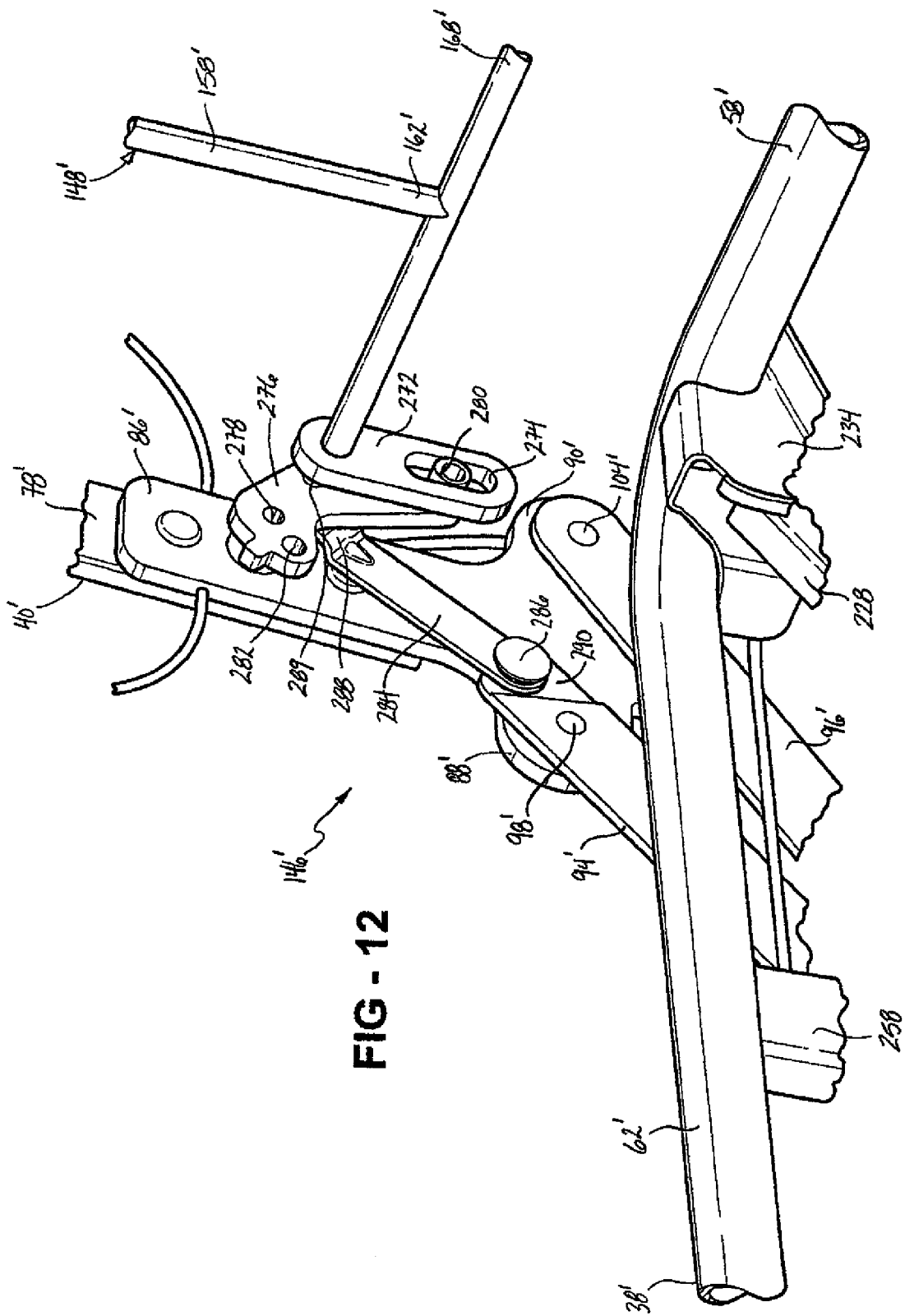
FIG. 12 is a fragmentary, inner perspective view of the reversible seat assembly illustrating an outboard side of a seat back control mechanism.
Figure 13:
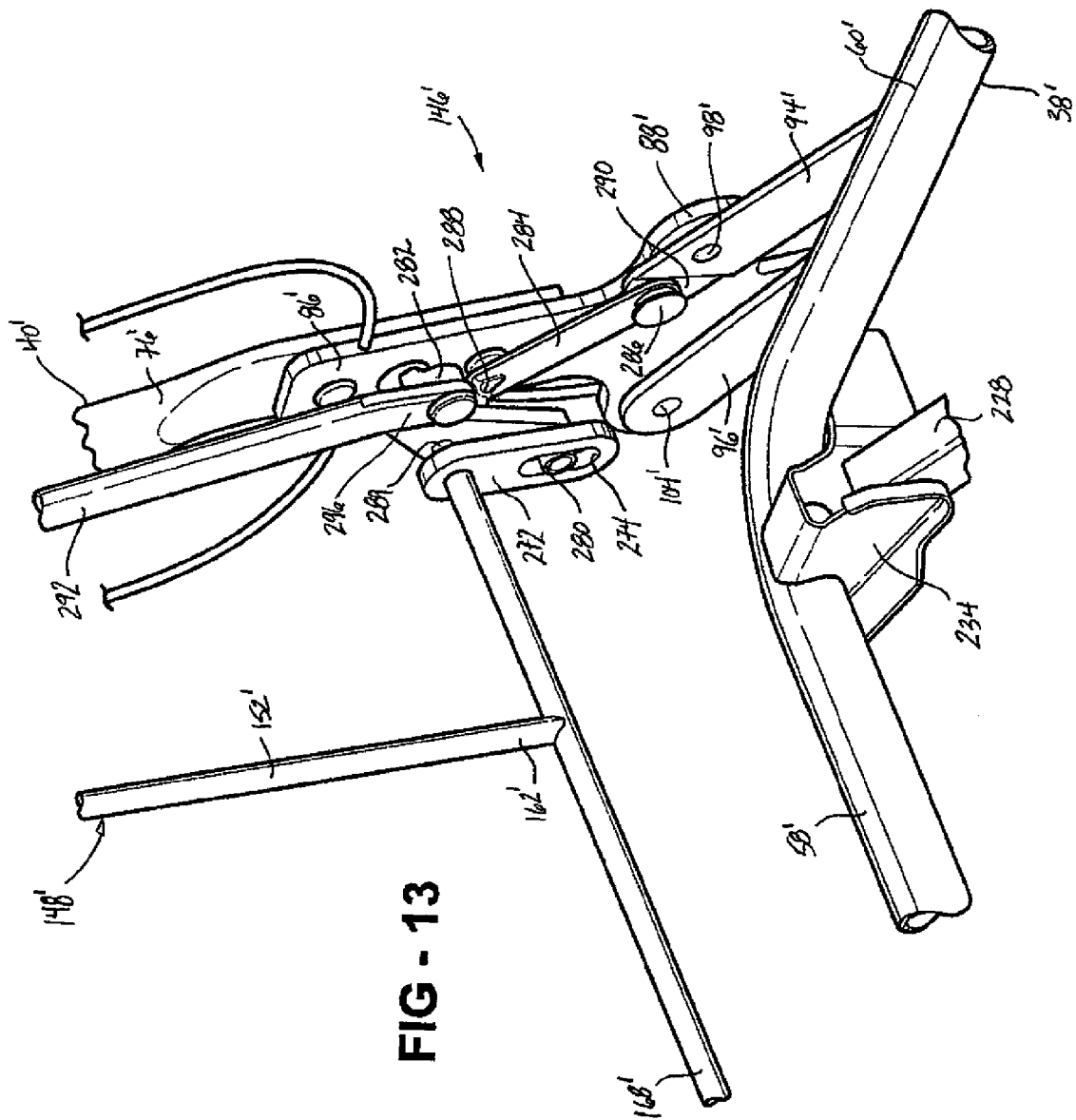
FIG. 13 is a fragmentary, inner perspective view of the reversible seat assembly illustrating an inboard side of the seat back control mechanism.

In this embodiment, the inboard 30' and outboard 32' seat risers each include an upwardly extending center portion 252 disposed between the forward 42' and rearward 44' ends. The center portion 252 includes a vertical slot 254 extending therethrough. A first mounting bracket 256 is fixedly secured to the inboard tube 60' of the seat cushion frame 38' and a second mounting bracket 258 is fixedly secured to the outboard tube 62'. The main pivot rod 72' extends laterally between the mounting brackets 256, 258 and is disposed through the vertical slots 254 in each of the spaced apart seat risers 30', 32'. The vertical slots 254 allow the main pivot rod 72' and therefore the center of the seat cushion 12' to move vertically up and down as the forward 200 and rearward 202 linkages guide the seat cushion 12' between the first and second inclined positions. When the seat cushion 12' is in the first inclined position, the upper 204 and lower 206 links of each forward linkage 200 are linearly aligned while the upper 228 and lower 230 links of each rearward linkage 202 are folded together, as shown in FIG. 9. Alternatively, when the seat cushion 12' is in the second inclined position, the upper 228 and lower 230 links of each rearward linkage 202 are linearly aligned while the upper 204 and lower 206 links of each forward linkage 200 are folded together, as shown in FIG. 11.

The seat back frame 40' is operatively coupled to the inboard 30' and outboard 32' seat risers by the pair of four bar linkage mechanisms consisting of the forward 94' and rearward 96' control links. The upper end 98' of each of the forward control links 94' is pivotally coupled to the end bracket arm 88' extending from the respective inboard 76' and outboard 78' tubes. The lower end 100' of each of the forward control links 94' is fixedly secured to opposite ends of the forward control rod 102' such that pivoting the forward control links 94' rotates the forward control rod 102'. In the second embodiment, the forward control rod 102' extends between and through the spaced apart seat risers 30', 32'.

Similarly, the upper end 104' of each of the rearward control links 96' is pivotally coupled to the end bracket arm 90' extending from the respective inboard 76' and outboard 78' tubes. The lower end 106' of each of the rearward control links 96' is fixedly secured to opposite ends of the rearward control rod 108' such that pivoting the rearward control links 96' rotates the rearward control rod 108'. The rearward control rod 108' extends between and through the spaced apart seat risers 30', 32'. Pivoting the forward 94' and rearward 96' control links about the respective lower ends 100', 106' moves the seat back frame 40', and therefore the seat back 14' between the first and second upright positions.

Figure 10:
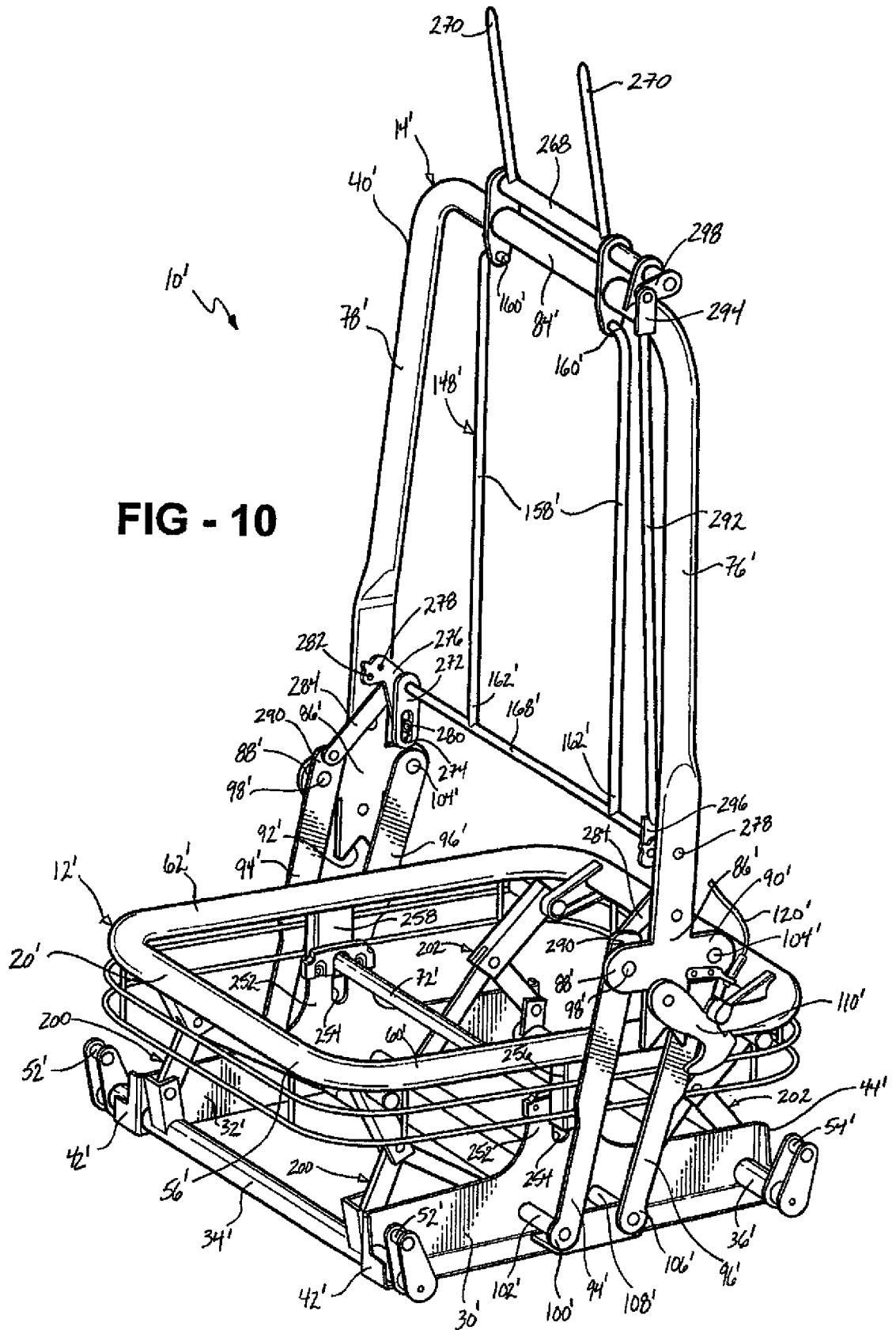
FIG. 10 is a perspective view of the second embodiment of the reversible seat assembly in the neutral position.

Referring to FIGS. 14 and 15, the seat assembly 10' in the second embodiment includes two tension coil springs 142'. One spring 142' extends between the front cross bar 34' and the forward control rod 102' and the other spring 142' extends between the rear cross bar 36' and the rearward control rod 108' for biasing the seat back 14' to the neutral position, as shown in FIG. 10. More specifically, each of the springs 142' extend between a first spring tab 260, 262 mounted to the front 34' and rear 36' cross bars, respectively, and a second spring tab 264, 266 mounted to the forward 102' and rearward 108' control rods, respectively. The second spring tabs 264, 266 extend horizontally toward the respective front 34' and rear 36' cross bars when the seat back 14' is in the neutral position such that the springs 142' are not extended. As the seat back 14' is moved from the neutral position toward either of the first or second upright positions, the forward 102' and rearward 108' control rods rotate and the second spring tabs 264, 266 mounted thereto move in a direction away from the front 34' and rear 36' cross bars, which causes the springs 142' to extend. Extending the springs 142' creates a force which must be overcome in order to move the seat assembly 10' into either the forward-facing seating position A' or the rearward-facing seating position B'.

Referring to FIGS. 9 through 11, in the second embodiment of the invention the head restraint frame 150' includes a horizontal tube 268 pivotally coupled to the upper cross tube 84' of the seat back frame 40' and a pair of spaced apart vertical posts 270 extending upwardly therefrom. The inner suspension support frame 148' includes the pair of spaced apart, elongated and cylindrical support bars 158' extending parallel with the inboard 76' and outboard 78' tubes between the first ends 160' and the second ends 162'. The first ends 160' are pivotally coupled to the upper cross tube 84'. The second ends 162' are connected to the cylindrical lower cross bar 168' which is generally perpendicular to the support bars 158' and extends between the inboard 76' and outboard 78' tubes. Opposing ends of the lower cross bar 168' include a control arm 272 extending downwardly therefrom. Each of the control arms 272 include a linear slot 274 extending therethrough.

The pair of seat back control mechanisms 146' automatically controls the position of the inner suspension support frame 148' relative to the seat back frame 40' in response to movement of the seat back 14' between the first and second upright positions. Referring to the outboard side of the seat assembly 10' in FIG. 12, one of the pair of seat back control mechanisms 146' will be described in detail. The control mechanism 146' includes a control cam 276 pivotally coupled to the end bracket 86' at pivot 278. The control cam 276 extends between a first end 280 and a second end 282. The first end 280 of the control cam 276 is pivotally and slidably coupled to the slot 274 in the control arm 272. A seat back control link 284 extends between a first end 286 and a second end 288. The first end 286 is pivotally coupled to a distal end 290 of the forward control link 94' adjacent the upper end 104' thereof. The second end 288 is pivotally coupled to the control cam 276 at pivot 289, between the pivot 278 and the first end 280. When the seat back 14' is in the first upright position, such that the seat assembly 10' is in the forward-facing seating position A', the inner suspension support frame 148' is disposed rearwardly of the seat back frame 40', as shown in FIG. 9. Alternatively, when the seat back 14' is in the second upright position, such that the seat assembly 10' is in the rearward-facing seating position B', the inner suspension support frame 148' is disposed forwardly of the seat back frame 40', as shown in FIG. 11.

The seat back control mechanism 146' also automatically controls the angular position of the head restraint 26' in response to movement of the seat back 14' between the first and second upright positions. Referring to the inboard side of the seat assembly 10' in FIGS. 9 and 13, a head restraint rod 292 extends between an upper end 294 and a lower end 296. The upper end 294 is pivotally coupled to a toggle link 298 fixedly secured to the horizontal tube 268 of the head restraint frame 150'. The lower end 296 is pivotally coupled to the second end 282 of the control cam 276. When the seat back 14' is in the first upright position, such that the seat assembly 10' is in the forward-facing seating position A', the head restraint 26' is tilted forwardly, as shown in FIG. 9. Alternatively, when the seat back 14' is in the second upright position, such that the seat assembly 10' is in the rearward-facing seating position B', the head restraint 26' is tilted rearwardly, as shown in FIG. 11.

In operation, starting with the seat assembly 10' in the forward-facing seating position A, as shown in FIG. 9, the cable 120' is actuated to release the latch mechanism 110' from the rearward striker 54' to move the seat back 14' from the first upright position to the second upright position. Moving the seat back 14' from the first upright position to the second upright position causes the forward 94' and rearward 96' control links to pivot about the respective lower ends 100', 106' in the counterclockwise direction (when viewed from FIG. 9). The pivotal movement of the forward 94' and rearward 96' control links causes the forward 102' and rearward 108' control rods to rotate in the counterclockwise direction, which in turn actuates the seat cushion control mechanism 122'. More specifically, the counterclockwise rotation of the forward control rod 102' causes the mounting tab 224 to also rotate in the counterclockwise direction which pulls the guide link 208 downwardly. Pulling the guide link 208 downwardly causes the upper 204 and lower 206 links to fold together, thus lowering the front end 20' of the seat cushion 12'. At the same time, the counterclockwise rotation of the rearward control rod 108' causes the mounting tab 248 to also rotate in the counterclockwise direction which pushes the guide link 232 upwardly. Pushing the guide link 232 upwardly causes the upper 228 and lower 230 links to linearly align, thus raising the rear end 22' of the seat cushion 12' and moving the seat cushion 12' from the first inclined position to the second inclined position.

During the movement of the seat back 14' from the first upright position to the second upright position, the forward control link 94' pulls the seat back control link 284 which in turn pivots the control cam 276 in the clockwise direction about the pivot 278. The clockwise rotation of the control cam 276 urges the first end 280 to pivot and slide within the slot 274 thereby moving the control arm 272 such that the inner suspension support frame 148' pivots to the position forwardly of the seat back frame 40'. At the same time, the clockwise rotation of the control cam 276 urges the second end 282 upwardly, raising the head restraint rod 292, which rotates the horizontal tube 268 of the head restraint frame 150' in the clockwise direction such that the head restraint 26' is tilted rearwardly.

As the seat back 14' approaches the second upright position, the cam end 114' of the latch mechanism 110' cammingly engages the forward striker 52' forcing the latch mechanism 110' to pivot in the counterclockwise direction to the unlocked position allowing the hook portion 116' to receive the forward striker 52' therein. The spring 118' then returns the latch mechanism 110' to the locked position engaged with the forward striker 52' to retain the seat back 14' in the second upright position and the seat cushion 12 in the second inclined position. The seat assembly 10' is now in the rearward-facing seating position B', as shown in FIG. 11.

To return the seat assembly 10' to the forward seating position A' the cable 120' is actuated to release the latch mechanism 110' from the forward striker 52' to move the seat back 14' from the second upright position to the first upright position. Moving the seat back 14' from the second upright position to the first upright position causes the forward 94' and rearward 96' control links to pivot about the respective lower ends 100', 106' in the clockwise direction (when viewed from FIG. 11). The pivotal movement of the forward 94' and rearward 96' control links causes the forward 102' and rearward 108' control rods to rotate in the clockwise direction, which in turn actuates the seat cushion control mechanism 122'. More specifically, the clockwise rotation of the forward control rod 102' causes the mounting tab 224 to also rotate in the clockwise direction which pushes the guide link 208 upwardly. Pushing the guide link 208 upwardly causes the upper 204 and lower 206 links to linearly align, thus raising the front end 20' of the seat cushion 12'. At the same time, the clockwise rotation of the rearward control rod 108' causes the mounting tab 248 to also rotate in the clockwise direction which pulls the guide link 232 downwardly. Pulling the guide link 232 downwardly causes the upper 228 and lower 230 links to fold together, thus lowering the rear end 22' of the seat cushion 12' and moving the seat cushion 12' from the second inclined position to the first inclined position.

During the movement of the seat back 14' from the second upright position to the first upright position, the forward control link 94' pushes the seat back control link 284 which in turn pivots the control cam 276 in the counterclockwise direction about the pivot 278. The counterclockwise rotation of the control cam 276 urges the first end 280 to pivot and slide within the slot 274 thereby moving the control arm 272 such that the inner suspension support frame 148' pivots to the position rearwardly of the seat back frame 40'. At the same time, the counterclockwise rotation of the control cam 276 urges the second end 282 downwardly, lowering the head restraint rod 292, which rotates the horizontal tube 268 of the head restraint frame 150' in the counterclockwise direction such that the head restraint 26' is tilted forwardly.

As the seat back 14' approaches the first upright position, the cam end 114' of the latch mechanism 110' cammingly engages the rearward striker 54' forcing the latch mechanism 110' to pivot in the counterclockwise direction to the unlocked position allowing the hook portion 116' to receive the rearward striker 54' therein. The spring 118' then returns the latch mechanism 110' to the locked position engaged with the rearward striker 54' to retain the seat back 14' in the first upright position and the seat cushion 12 in the first inclined position. The seat assembly 10' is now in the forward-facing seating position A', as shown in FIG. 11.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A reversible seat assembly for use in an automotive vehicle comprising:

a pair of spaced apart seat risers adapted for mounting said seat assembly to a floor of the vehicle, said seat risers extending between a forward end and a rearward end and including first and second inclined edges;

a seat cushion pivotally coupled to said seat risers by a main pivot rod extending therebetween, said seat cushion pivotal between a first inclined position adjacent said second inclined edge and a second inclined position adjacent said first inclined edge;

a seat back including a pair of parallel forward and rearward control links operatively coupling said seat back to said seat risers, said forward control links extending between an upper end pivotally coupled to said seat back and a lower end pivotally coupled to said seat risers, said rearward control links extending between an upper end pivotally coupled to said seat back and a lower end pivotally coupled to said seat risers by a rearward control rod extending therebetween; and a seat cushion control mechanism including a first link extending between a proximal end fixedly secured to said rearward control rod and an opposite distal end, a second link extending between a proximal end fixedly secured to said main pivot rod and an opposite distal end, and a third link extending between a first end pivotally coupled to said distal end of said first link and a second end pivotally coupled to said distal end of said second link for automatically controlling said seat cushion between said first and second inclined positions in response to movement of said seat back between a first upright position adjacent said forward end of said seat risers and a second upright position adjacent said rearward end of said seat risers thereby defining a forward-facing seating position and a rearward-facing seating position.

2. A reversible seat assembly as set forth in claim 1 including front and rear cross bar interconnecting said forward and rearward ends of said seat risers, opposing ends of said front and rear cross bars including forward and rearward strikers fixedly mounted thereto outwardly of said seat risers.

3. A reversible seat assembly as set forth in claim 2 wherein said seat back includes a seat back frame disposed therein extending between an upper end and an opposite lower end.

4. A reversible seat assembly as set forth in claim 3 wherein said lower end of said seat back frame includes a pair of end brackets each having a downward-facing notch for engaging said rearward strikers when said seat back is in said first upright position and said forward strikers when said seat back is in said second upright position.

5. A reversible seat assembly as set forth in claim 4 including a latch mechanism operatively coupled to one of said end brackets for movement between a locked position engaging one of said forward and rearward strikers when said seat assembly is in said forward or rearward-facing seating position and an unlocked position released from said forward and rearward strikers to allow movement of said seat back between said first and second upright positions.

6. A reversible seat assembly as set forth in claim 5 including a spring extending between said rearward control and said rear cross bar biasing said seat back to a neutral position between said first and second upright positions.

7. A reversible seat assembly as set forth in claim 6 including a tab mounted to said rearward control rod extending horizontally toward said rear cross bar when said seat back is in said neutral position, said spring extending between said tab and said rear cross bar.

8. A reversible seat assembly as set forth in claim 7 wherein said seat back includes an inner suspension seat back frame operatively coupled to said seat back frame for movement between a first position disposed rearwardly thereof when said seat back is in said first upright position and a second position disposed forwardly thereof when said seat back is in said second upright position, said inner suspension seat back frame extending between an upper end and a lower end having a lower control arm.

9. A reversible seat assembly as set forth in claim 8 including a seat back control mechanism operatively coupled between one of said forward control links and said lower control arm for automatically controlling said inner suspension seat back frame between said first and second positions.

10. A reversible seat assembly as set forth in claim 9 wherein said seat back control mechanism includes a control cam and a seat back control link, said control cam pivotally coupled to one of said end brackets and having a first lobe pivotally coupled to said lower control arm and a second lobe, said seat back control link extending between a first end pivotally coupled to one of said forward control links between said upper and lower ends and a second end pivotally coupled to said second lobe.

11. A reversible seat assembly as set forth in claim 10 including a head restraint pivotally coupled to said upper end of said seat back frame and operatively coupled to said upper end of said inner suspension seat back frame for pivotal movement between a forwardly tilted position when said seat back is in said first upright position and a rearwardly tilted position when said seat back is in said second upright position.

12. A reversible seat assembly as set forth in claim 11 including a seat belt buckle extending between a proximal end pivotally coupled to one of said end brackets and an opposite distal end.

13. A reversible seat assembly as set forth in claim 12 including a guide link extending between a first end pivotally coupled to one of said forward control links adjacent said upper end and a second end pivotally coupled to said seat belt buckle adjacent said proximal end for automatically pivoting said seat belt buckle relative to said seat back as said seat back moves between said first and second upright positions.

14. A reversible seat assembly for use in an automotive vehicle comprising:

a pair of spaced apart seat risers adapted for mounting said seat assembly to a floor of the vehicle;

a seat cushion extending between a front end and a rear end, said seat cushion operatively coupled to said pair of seat risers for movement between a first inclined position wherein said front end is spaced farther from said floor than said rear end and a second inclined position wherein said rear end is spaced farther from said floor than said front end;

a seat back operatively coupled to said risers by a pair of parallel forward and rearward control links, said forward control links extending between an upper end pivotally coupled to said seat back and a lower end pivotally coupled to said seat risers by a forward control rod extending therebetween, said rearward control links extending between an upper end pivotally coupled to said seat back and a lower end pivotally coupled to said seat risers by a rearward control rod extending therebetween; and a seat cushion control mechanism including a pair of forward linkages operatively coupled between said front end of said seat cushion and said seat risers and a pair of rearward linkages operatively coupled between said rear end of said seat cushion and said seat risers for automatically controlling said seat cushion between said first and second inclined positions in response to movement of said seat back between a first upright position adjacent said rear end of said seat cushion and a second upright position adjacent said front end of said seat cushion thereby defining a forward-facing seating position and a rearward-facing seating position.

15. A reversible seat assembly as set forth in claim 14 including front and rear cross bars interconnecting said seat risers, opposing ends of said front and rear cross bars including forward and rearward strikers fixedly mounted thereto outwardly of said seat risers.

16. A reversible seat assembly as set forth in claim 15 wherein each of said forward linkages include an upper link extending between a proximal end pivotally coupled to said front end of said seat cushion and a distal end, a lower link extending between a proximal end pivotally coupled to said front cross bar and a distal end pivotally coupled to said distal end of said upper link, and a forward guide link extending between said distal ends of said upper and lower links and said forward control rod, and each of said rearward linkages include an upper link extending between a proximal end pivotally coupled to said rear end of said seat cushion and a distal end, a lower link extending between a proximal end pivotally coupled to said rear cross bar and a distal end pivotally coupled to said distal end of said upper link, and a rearward guide link extending between said distal ends of said upper and lower links and said rearward control rod.

17. A reversible seat assembly as set forth in claim 16 wherein said forward guide links actuate said upper and lower links of said forward linkages to linearly align and said rearward guide links actuate said upper and lower links of said rearward linkages to fold together when said seat cushion is in said first inclined position, and said forward guide links actuate said upper and lower links of said forward linkages to fold together and said rearward guide links actuate said upper and lower links of said rearward linkages to linearly align when said seat cushion is in said second inclined position.

18. A reversible seat assembly as set forth in claim 17 wherein said seat back includes a seat back frame disposed therein extending between an upper end and an opposite lower end.

19. A reversible seat assembly as set forth in claim 18 wherein said lower end of said seat back frame includes a pair of end brackets each having a downward-facing notch for engaging said rearward strikers when said seat back is in said first upright position and said forward strikers when said seat back is in said second upright position.

20. A reversible seat assembly as set forth in claim 19 including a latch mechanism operatively coupled to one of said end brackets for movement between a locked position engaging one of said forward and rearward strikers when said seat assembly is in said forward or rearward-facing seating position and an unlocked position released from said forward and rearward strikers to allow movement of said seat back between said first and second upright positions.

21. A reversible seat assembly as set forth in claim 20 including a first spring extending between said forward control rod and said front cross bar and a second spring extending between said rearward control rod and said rear cross bar, said first and second springs biasing said seat back to a neutral position between said first and second upright positions.

22. A reversible seat assembly as set forth in claim 21 including a first tab mounted to said forward control rod extending horizontally toward said front cross bar and a second tab mounted to said rearward control rod extending horizontally toward said rear cross bar when said seat back is in said neutral position, said first spring extending between said first tab and said front cross bar and said second spring extending between said second tab and said rear cross bar.

23. A reversible seat assembly as set forth in claim 22 wherein said seat back includes an inner suspension seat back frame extending between an upper end pivotally coupled to said upper end of said seat back frame and a lower end having a control arm, said inner suspension seat back frame pivotal between a first position disposed rearwardly of said seat back frame when said seat back is in said first upright position and a second position disposed forwardly of said seat back frame when said seat back is in said second upright position.

24. A reversible seat assembly as set forth in claim 23 including a seat back control mechanism operatively coupled between one of said forward control links and said control arm for automatically controlling said inner suspension seat back frame between said first and second positions.

25. A reversible seat assembly as set forth in claim 24 wherein said seat back control mechanism includes a control cam and a seat back control link, said control cam pivotally coupled to one of said end brackets and having a first end pivotally and slidably coupled to said control arm and a second end, said seat back control link extending between a first end pivotally coupled to one of said forward control links adjacent said upper end and a second end pivotally coupled to said control cam between said first and second ends.

26. A reversible seat assembly as set forth in claim 25 including a head restraint pivotally coupled to said upper end of said seat back frame and operatively coupled to said seat back control mechanism for pivotal movement between a forwardly tilted position when said seat back is in said first upright position and a rearwardly tilted position when said seat back is in said second upright position.

27. A reversible seat assembly as set forth in claim 26 wherein said head restraint includes a head restraint frame disposed therein, said head restraint frame including a horizontal tube pivotally coupled to said upper end of said seat back frame and a pair of spaced apart vertical posts extending therefrom.

28. A reversible seat assembly as set forth in claim 27 including a head restraint rod extending between an upper end pivotally coupled to a toggle link fixedly secured to said horizontal tube of said head restraint frame and a lower end pivotally coupled to said second end of said control cam.

* * * * *